United States Patent
Biswas et al.

(10) Patent No.: US 7,032,026 B1
(45) Date of Patent: Apr. 18, 2006

(54) METHOD AND APPARATUS TO FACILITATE INDIVIDUAL AND GLOBAL LOCKOUTS TO NETWORK APPLICATIONS

(75) Inventors: Kamalendu Biswas, Hayward, CA (US); Arun Swaminathan, San Carlos, CA (US); Gaurav Bhatia, Foster City, CA (US)

(73) Assignee: Oracle International Corp., Redwood Shores, CA (US)

(*) Notice: Subject to any disclaimer, the term of this patent is extended or adjusted under 35 U.S.C. 154(b) by 703 days.

(21) Appl. No.: 10/043,800

(22) Filed: Jan. 10, 2002

Related U.S. Application Data

(60) Provisional application No. 60/316,808, filed on Aug. 31, 2001.

(51) Int. Cl.
*G06F 15/16* (2006.01)

(52) U.S. Cl. ............... 709/229; 709/201; 709/203; 709/219; 709/225

(58) Field of Classification Search .......... 709/218, 709/223, 229, 201, 203, 219, 225
See application file for complete search history.

(56) References Cited

U.S. PATENT DOCUMENTS

| | | | | |
|---|---|---|---|---|
| 5,699,514 A | * | 12/1997 | Durinovic-Johri et al. | 713/202 |
| 5,928,363 A | * | 7/1999 | Ruvolo | 713/201 |
| 6,339,830 B1 | * | 1/2002 | See et al. | 713/202 |
| 6,405,318 B1 | * | 6/2002 | Rowland | 713/200 |
| 6,662,228 B1 | * | 12/2003 | Limsico | 709/225 |
| 6,714,970 B1 | * | 3/2004 | Fiveash et al. | 709/219 |

\* cited by examiner

*Primary Examiner*—Ario Etienne
*Assistant Examiner*—Emmanuel Coffy
(74) *Attorney, Agent, or Firm*—Park, Vaughan & Fleming, LLP; Edward J. Grundler

(57) ABSTRACT

One embodiment of the present invention provides a system that facilitates locking an adversary out of a network application. The system operates by receiving a request at a server, which includes an authentication credential, to access the network application. This authentication credential includes a user identifier associated with a user and an address of a user device. The system examines an audit log to determine if the user identifier has been locked out from the address of the user device. If so, the system denies access to the network application. Otherwise, the system checks the authentication credential for validity. If the authentication credential is valid, the system allows access to the network application. Otherwise, the system logs a failed attempt in the audit log and denies access to the network application. After a threshold number of failed attempts, the user identifier is locked out from the network address.

14 Claims, 3 Drawing Sheets

METHOD AND APPARATUS TO FACILITATE INDIVIDUAL AND GLOBAL LOCKOUTS TO NETWORK APPLICATIONS

RELATED APPLICATION

This application hereby claims priority under 35 U.S.C. §119 to a Provisional Patent Application entitled, "Security Mechanisms in a Network Environment," filed Aug. 31, 2001 by inventors Arun Swaminathan, Kamalendu Biswas, and Gaurav Bhatia (Application No. 60/316,808).

BACKGROUND

1. Field of the Invention

The present invention relates to network-based computer applications. More specifically, the present invention relates to a method and an apparatus that facilitates associating lockouts with a user identifier for accessing network applications.

2. Related Art

Modern Enterprise computing systems distribute computer application programs across application servers accessible across a network such as the World Wide Web. Typically, these application programs require a user to authenticate prior to allowing the user to access the application. Many of these web-based computer applications rely on password-based authentication.

Password based authentication depends upon using a limited length password selected from a known character set. It is possible, therefore, for an adversary to mount a brute force attack by exhaustively trying different passwords to gain unauthorized entry to the application. Administrators employ many techniques to counter this threat, such as forcing a user to change the password periodically, requiring a minimum length password, requiring a complex password, and the like.

These techniques do not, however, obviate a brute force attack on the system. The system can, however, deny entry during a brute force attack by imposing a lockout on the account being attacked. A brute force attack can be detected by observing a specified number of unsuccessful attempts to access the application with an incorrect password. When a brute force attack is detected, the system prevents the user's account from accessing the application for a specified amount of time, or until an administrator unlocks the user's account.

While effective at preventing unauthorized entry into the application, a lockout has the undesired effect of locking out the legitimate user of the account until the account has been reset-either automatically or by the administrator. This constitutes a denial-of-service attack where an adversary can prevent the legitimate user from accessing the application.

What is needed is a method and an apparatus that facilitates allowing a legitimate user of an account to access a web-based application while preventing a denial of service attack from an adversary.

SUMMARY

One embodiment of the present invention provides a system that facilitates locking an adversary out of a network application. The system operates by first receiving a request at a server, which includes an authentication credential, to access the network application. This authentication credential includes a user identifier associated with a user and a network address of a user device. The system next examines an audit log to determine if the user identifier has been locked out from the network address of the user device. If so, the system denies access to the network application. Otherwise, the system checks the authentication credential for validity. If the authentication credential is valid, the system allows access to the network application. Otherwise, the system logs a failed attempt in the audit log and denies access to the network application. After a threshold number of failed attempts, the user identifier is locked out from the network address.

In one embodiment of the present invention, the system imposes a global lockout for the user identifier after a threshold number of network addresses are locked out for the user identifier.

In one embodiment of the present invention, the system removes a lockout after a predetermined period of time.

In one embodiment of the present invention, an administrator of the server manually removes a lockout.

In one embodiment of the present invention, the authentication credential includes a user name and a password.

In one embodiment of the present invention, checking the authentication credential for validity involves verifying that an administrator has authorized access to the network application for a combination of the user name and the password, and determining if the request violates an access rule in a rule table.

In one embodiment of the present invention, the access rule can specify an allowed time-of-day, an allowed number of attempts, an allowed network address, and an allowed network domain.

In one embodiment of the present invention, the network address includes an Internet Protocol address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computer Systems

Figure 1:
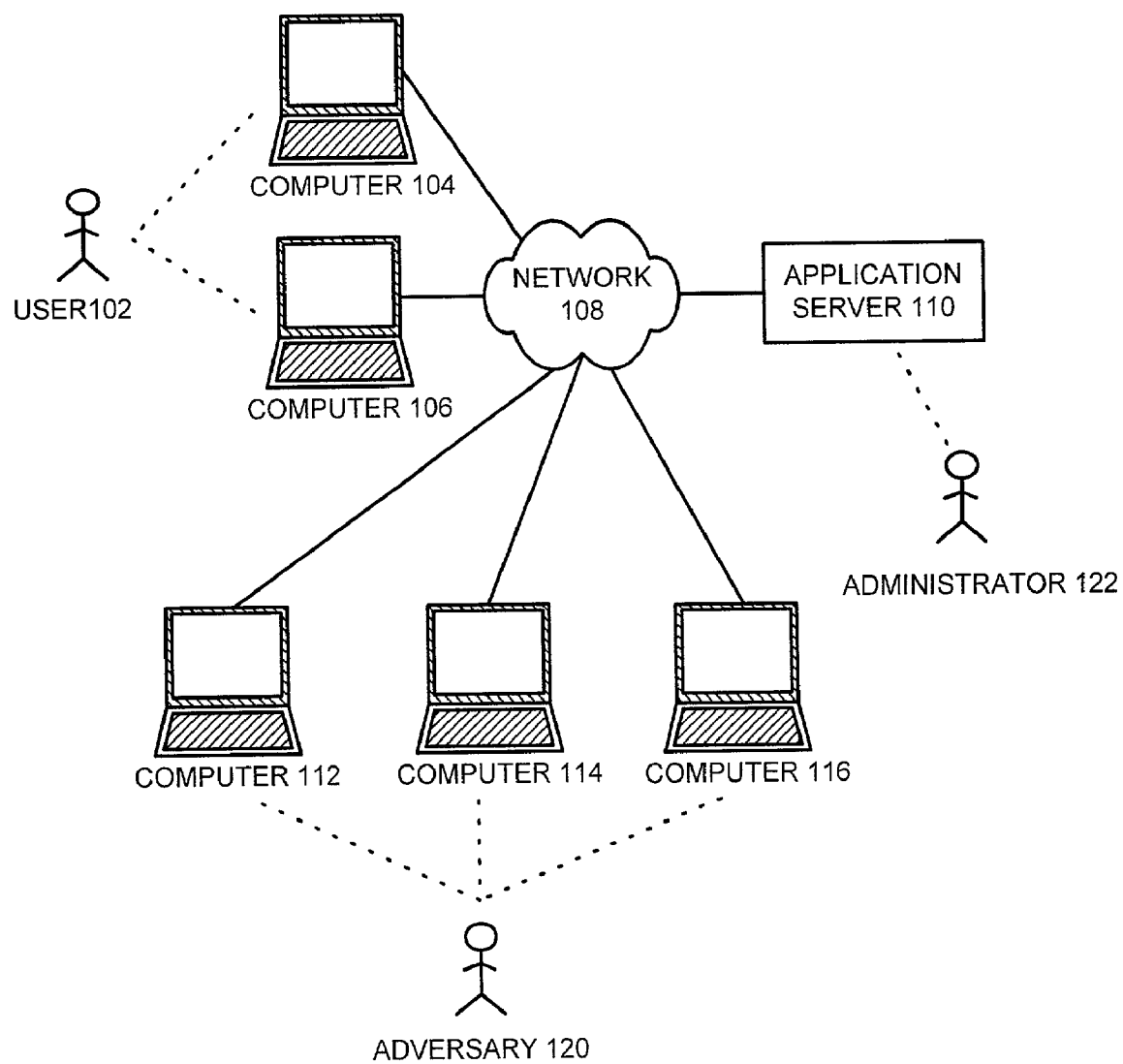
FIG. 1 illustrates computer systems coupled together in accordance with an embodiment of the present invention.

FIG. 1 illustrates computer systems coupled together in accordance with an embodiment of the present invention. The system illustrated in FIG. 1 includes computers 104, 106, 112, 114, and 116 and application server 110 coupled together by network 108. Computers 104, 106, 112, 114, and 116 and application server 110 can generally include any type of computer system, including, but not limited to, a computer system based on a microprocessor, a mainframe computer, a digital signal processor, a portable computing device, a personal organizer, a device controller, and a computational engine within an appliance. Note that the system is not limited to the number of computers and application servers shown and can generally include any number of computers and application servers.

Network 108 can generally include any type of wire or wireless communication channel capable of coupling together computing nodes. This includes, but is not limited to, a local area network, a wide area network, or a combination of networks. In one embodiment of the present invention, network 108 includes the Internet.

Administrator 122 controls access to application server 110, and to the applications stored thereon, by identifying authorized user name/password combinations and by establishing access rules such as allowed time-of-day, allowed number of access attempts, allowed network addresses, and allowed network domains.

User 102 is authorized access to the applications on application server 110 by administrator 122. User 102 typically accesses application server 110 through computer 104 and computer 106. However, user 102 may be authorized to use other computers as well.

Adversary 120 may attempt to access the applications on server 110 by masquerading as user 102 using a computer such as computer 112, 114, or 116. After a threshold number of failed attempts to access these applications, the system locks out the user identifier from whichever of computers 112, 114, or 116 is being used. This lockout is based on the user identifier and the network address of the computer. Typically, the network address is the Internet protocol (IP) address of the computer. Note that denying access to the user identifier from a specific IP address does not deny access to the user from another computer, say computer 104. Note also that the system may impose a global lockout for the user identifier after a threshold number of IP addresses have been locked out for the user identifier.

After the user identifier has been locked out, either globally or by IP address, the system may, at the discretion of administrator 122, automatically remove the lockout after a period of time or administrator 122 may remove the lockout manually.

Application Server 110

Figure 2:
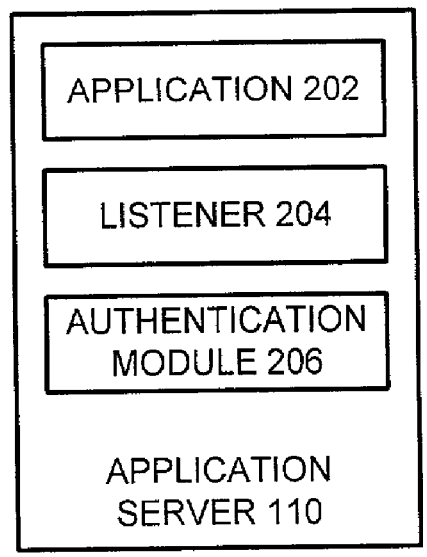
FIG. 2 illustrates application server 110 in accordance with an embodiment of the present invention.

FIG. 2 illustrates application server 110 in accordance with an embodiment of the present invention. Application server 110 includes application 202, listener 204, and authentication module 206. Application 202 is a network application such as e-mail, database services, and the like. Application server 110 may include more than one application.

Listener 204 monitors access requests from network 108 for application 202. When listener 204 detects a new request, the request is routed to authentication module 206 to check for lockout and for valid authentication. Authentication module 206 determines whether the accessing IP address has been locked out and whether the user identifier is authorized to access application 202 according to access rules established by administrator 122. Authentication module 206 processes the access request as described below in conjunction with FIGS. 3 and 4.

Authentication Module 206

Figure 3:
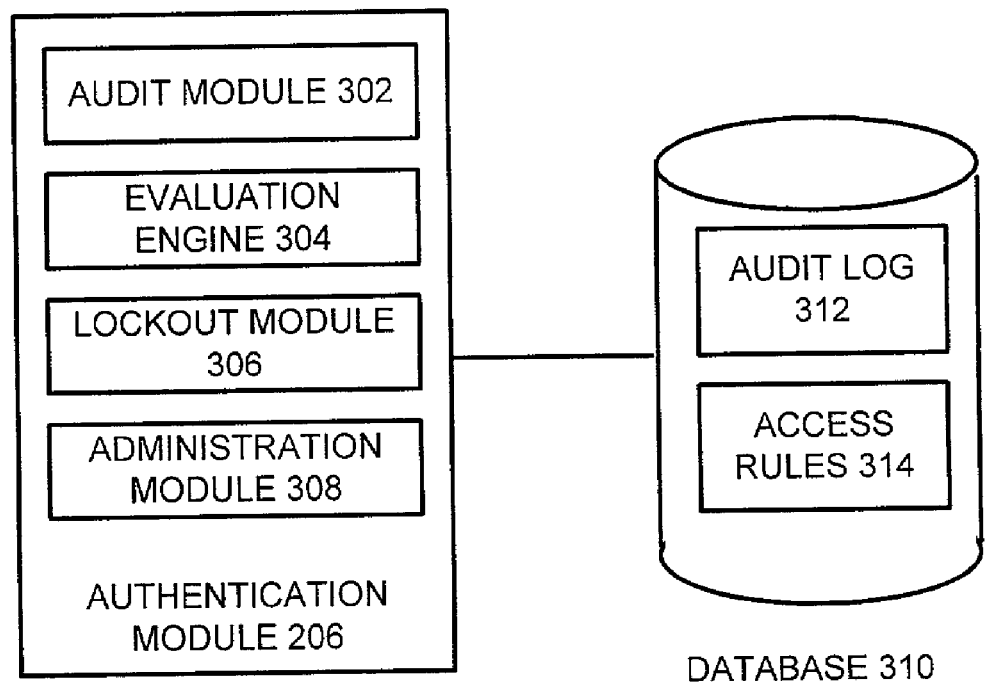
FIG. 3 illustrates authentication module 206 in accordance with an embodiment of the present invention.

FIG. 3 illustrates authentication module 206 in accordance with an embodiment of the present invention. Authentication module 206 includes audit module 302, evaluation engine 304, lockout module 306, and administration module 308. Authentication module 206 is coupled to database 310 for access to various tables and files related to authenticating an access request for application 202. Database 310 includes audit log 312 and access rules 314.

Audit module 302 logs access attempts and disposition of these access attempts in audit log 312. Audit log 312 is used to store the user identifier and the Internet protocol (IP) address associated with the access attempt. Lockout module 306 prevents accesses from an IP address for a specific user identifier after a threshold number of failed access attempts take place from that IP address for the specific user identifier. Additionally, lockout module 306 can globally lock out a user identifier after a threshold number of IP addresses have been locked out for the specific user identifier.

If the user identifier has not been locked out for the IP address associated with an access attempt, evaluation engine 304 determines if the access request is valid. Evaluation engine 304 uses the user identifier and password to determine if the user associated with the user identifier is authorized to access application 202. Evaluation engine 304 also inspects the access rules to determine if the access request violates any of these access rules. These access rules can include allowed time-of-day, allowed number of access attempts, allowed network addresses, allowed network domains, and the like. If none of the access rules have been violated and if the access credentials are valid, authentication module 206 grants access to application 202. Otherwise, access is denied. In either case, an entry is made in audit log 312 by audit module 302 to record the disposition of the access request.

Administrator 122 uses administration module 308 to establish accounts on application server 110 and to specify the rules within access rules 314. Administrator 122 also uses administration module 308 to establish the method of recovery from a lockout and to manually remove active lockouts from the system.

Accessing a Network Application

Figure 4:
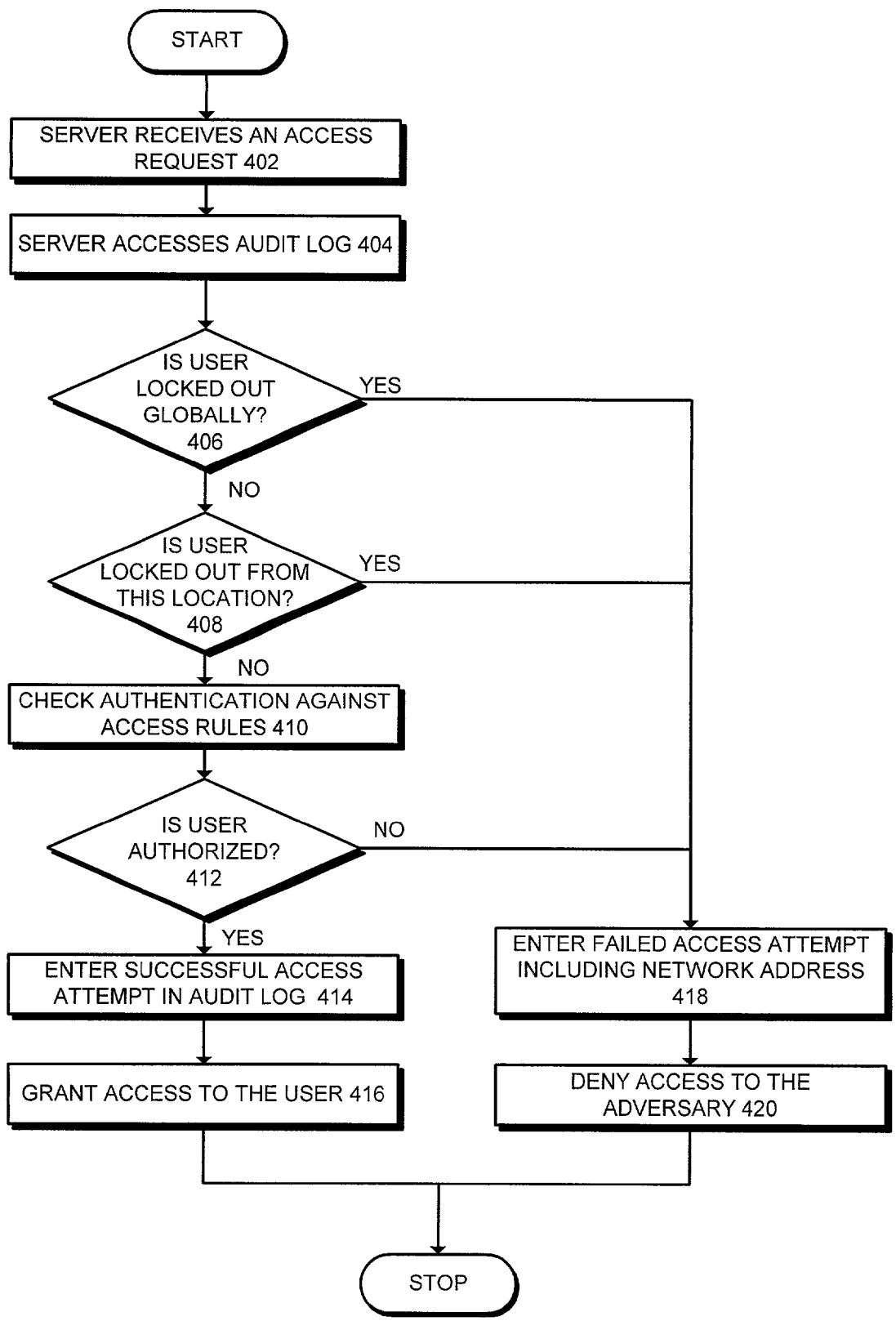
FIG. 4 is a flowchart illustrating the process of accessing a network application in accordance with an embodiment of the present invention.

FIG. 4 is a flowchart illustrating the process of accessing a network application in accordance with an embodiment of the present invention. The system starts when application server 110 receives a request for access to application 202 (step 402). In response to this request, audit module 302 within authentication module 206 accesses information from audit log 312 on database 310 (step 404).

From this information, audit module 302 determines if the user identifier within the access request has been globally locked out from accessing application 202 (step 406). Note that the user identifier can be globally locked out after a threshold number of Internet protocol (IP) addresses have been locked out for the user identifier.

If the user identifier has not been globally locked out, audit module 302 determines of the user identifier has been locked out for the specific IP address associated with the access request (step 408). Note that the specific IP address can be locked out after a threshold number of failed access requests have originated from that IP address.

If the user identifier has not been locked out from the specific IP address, evaluation engine 304 checks the authentication data against access rules 314 (step 410). Evaluation engine 304 then determines if the user is authorized to access application 202 (step 412). If so, audit module 302 enters the successful access attempt in audit log 312 (step 414). Next, authentication module 206 grants access to user 102 (step 416).

If the user is globally locked out at step 406, or if the user is locked out from the specific IP address at step 408, or if the user is not authorized to access application 202 at step 412, audit module 302 logs the failed access attempt, including the IP address of the computer, in audit log 312 (step 418).

Finally, authentication module 206 denies access to adversary 120 (step 420).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to facilitate locking an adversary out of a network application, comprising:
   receiving at a server a request, including an authentication credential, to access the network application, wherein the authentication credential includes a user identifier and a specific network address of a user device;
   if the user identifier has been locked out from the specific network address,
   denying access to the network application; and
   if the authentication credential is valid, allowing access to the network application, otherwise,
      logging a failed attempt in the audit log,
      imposing a lockout for the user identifier from only the specific network address after a threshold number of failed attempts from the specific network address,
      if a threshold number of specific network addresses are locked out for the user identifier, imposing a global lockout for the user identifier, and
      denying access to the network application.

2. The method of claim 1, further comprising: removing a lockout after a predetermined period of time.

3. The method of claim 1, further comprising: manually removing a lockout by an administrator of the server.

4. The method of claim 1, wherein the authentication credential includes a user name and a password.

5. The method of claim 4, wherein checking the authentication credential for validity involves:
   verifying that an administrator has authorized access to the network application for a combination of the user name and the password; and
   determining if the request violates an access rule in a rule table.

6. The method of claim 5, wherein the access rule can specify:
   an allowed time-of-day;
   an allowed number of access attempts;
   an allowed network address; and
   an allowed network domain.

7. The method of claim 1, wherein the network address includes an Internet Protocol address.

8. A computer-readable storage medium storing instructions that when executed by a computer cause the computer to perform a method to facilitate locking an adversary out of a network application, the method comprising:
   receiving at a server a request, including an authentication credential, to access the network application, wherein the authentication credential includes a user identifier and a specific network address of a user device;
   if the user identifier has been locked out from the specific network address,
   denying access to the network application; and
   if the authentication credential is valid, allowing access to the network application, otherwise,
      logging a failed attempt in the audit log,
      imposing a lockout for the user identifier from only the specific network address after a threshold number of failed attempts from the specific network address,
      if a threshold number of network addresses are locked out for the user identifier, imposing a global lockout for the user identifier, and
      denying access to the network application.

9. The computer-readable storage medium of claim 8, the method further comprising: removing a lockout after a predetermined period of time.

10. The computer-readable storage medium of claim 8, the method further comprising: manually removing a lockout by an administrator of the server.

11. The computer-readable storage medium of claim 8, wherein the authentication credential includes a user name and a password.

12. The computer-readable storage medium of claim 11, wherein checking the authentication credential for validity involves:
   verifying that an administrator has authorized access to the network application for a combination of the user name and the password; and
   determining if the request violates an access rule in a rule table.

13. The computer-readable storage medium of claim 12, wherein the access rule can specify:
   an allowed time-of-day;
   an allowed number of access attempts;
   an allowed network address; and
   an allowed network domain.

14. The computer-readable storage medium of claim 8, wherein the network address includes an Internet Protocol address.

* * * * *